June 6, 1939.   S. BRAND   2,161,612
CARD PUNCHING MACHINE
Filed Nov. 26, 1937   9 Sheets-Sheet 1

INVENTOR
Samuel Brand
BY
ATTORNEY

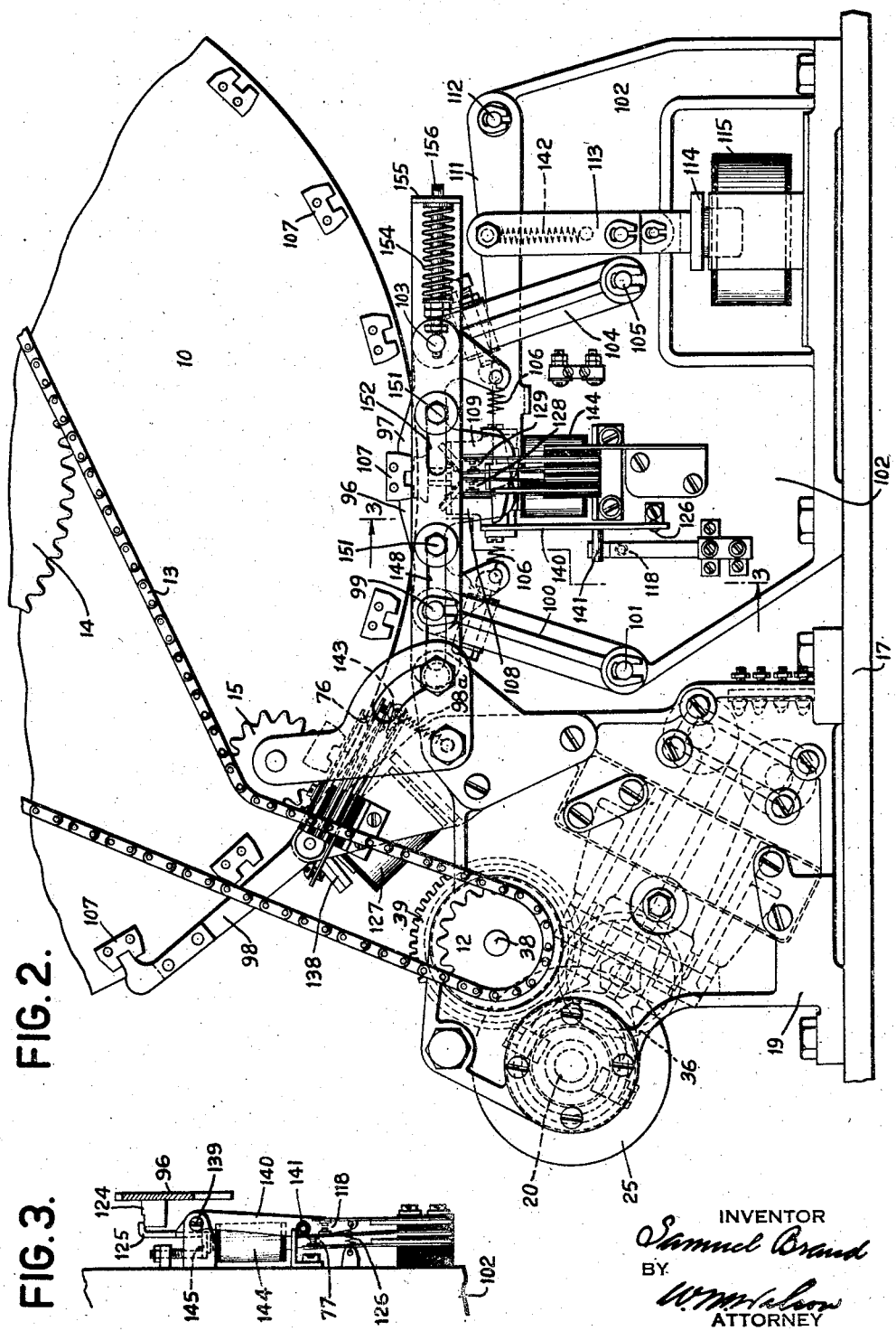

June 6, 1939.  S. BRAND  2,161,612
CARD PUNCHING MACHINE
Filed Nov. 26, 1937  9 Sheets-Sheet 3

INVENTOR
Samuel Brand
BY
W. M. Wilson
ATTORNEY

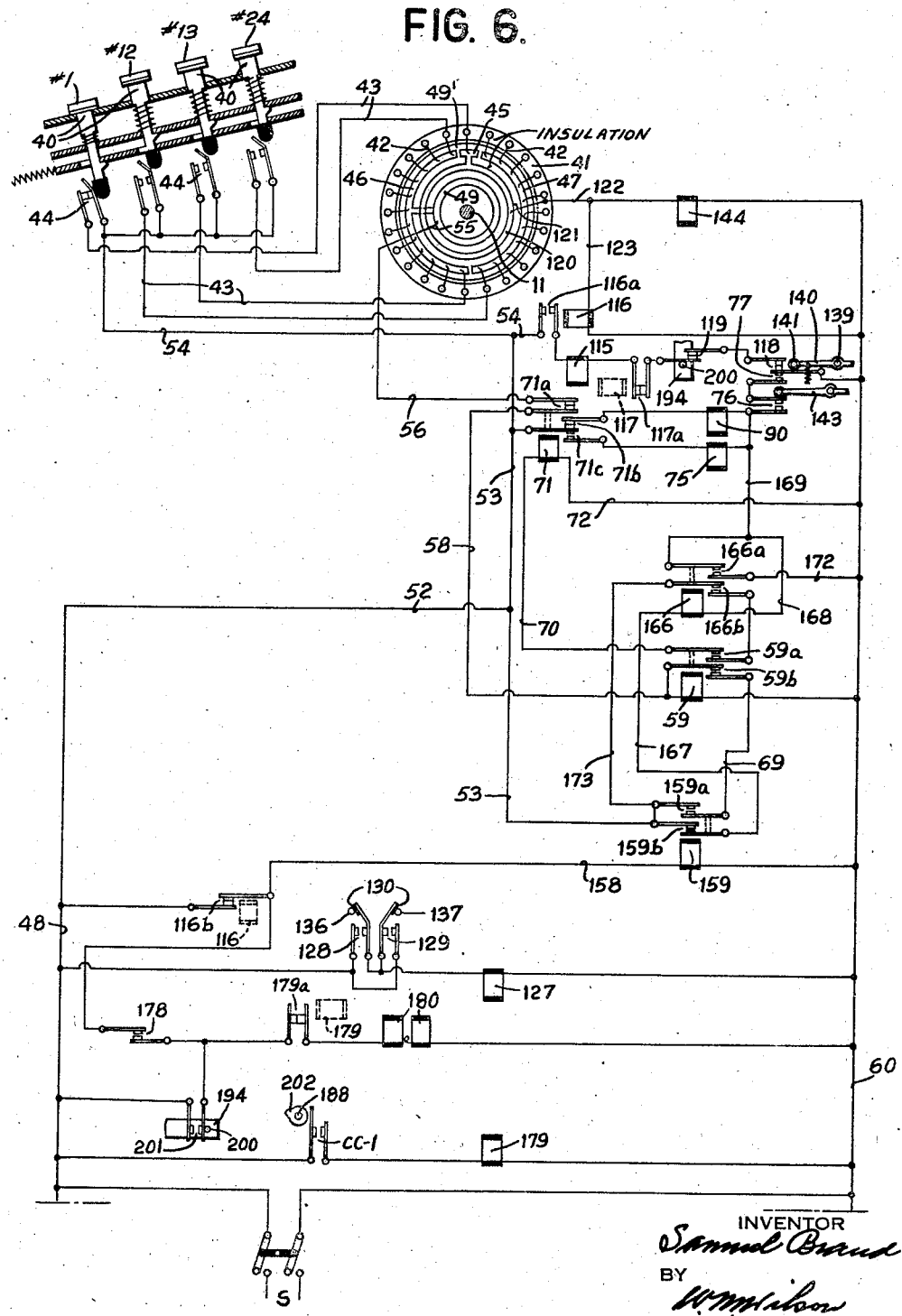

June 6, 1939.　　　　S. BRAND　　　　2,161,612
CARD PUNCHING MACHINE
Filed Nov. 26, 1937　　　9 Sheets-Sheet 6

INVENTOR
Samuel Brand
BY
ATTORNEY

June 6, 1939.  S. BRAND  2,161,612
CARD PUNCHING MACHINE
Filed Nov. 26, 1937  9 Sheets-Sheet 7

INVENTOR
Samuel Brand
BY
W. M. Wilson
ATTORNEY

June 6, 1939.  S. BRAND  2,161,612

CARD PUNCHING MACHINE

Filed Nov. 26, 1937  9 Sheets-Sheet 9

INVENTOR
Samuel Brand
BY
ATTORNEY

Patented June 6, 1939

2,161,612

UNITED STATES PATENT OFFICE 2,161,612

CARD PUNCHING MACHINE

Samuel Brand, Binghamton, N. Y., assignor to International Business Machines Corporation, New York, N. Y., a corporation of New York Application November 26, 1937, Serial No. 176,541

15 Claims. (Cl. 164—113)

The improvements herein described forming the subject matter of the present invention relate to a machine capable of performing functions for securing the same results as the machine of the type shown in the patent to F. L. Fuller, No. 1,966,623. It is thought that a brief description of this type of machine will be helpful in understanding the purpose for which the present invention is devised.

Such machines are designed to simultaneously list and sort groups of promicuously arranged checks so that checks drawn on the same bank can be sorted and a list of the amounts of checks of each group can be printed on a separate tape. The amounts of the checks are listed under control of a ten-key keyboard and the checks are then dropped into an aperture which communicates with a selected compartment of a sorting drum which carries compartments annularly arranged about the drum. The drum is rotated under control of the keys of a second keyboard to bring the selected compartment into registration with the aperture. The sorting drum is controlled to rotate from its last position to the selected position in the direction of the shorter path.

These machines are also provided with a plurality of totalizers, there being a totalizer for each sorting compartment. The amount of each check sorted in a particular compartment is entered into the totalizer identified with the compartment. The machines are also provided with separate printers, one for each compartment, so that the amounts of checks of the same classification can be printed in a related way on a separate tape.

The present machine is capable of preparing a punched card upon which is designated the classification of the check which corresponds to the compartment selecting key operated, and the amount of the check which is entered under control of the ten-key keyboard. When each card is punched with this data it is automatically transported to the feeding mechanism for the sorting drum and it is thereby disposed in the preselected sorting compartment.

To prepare the lists from the sorted and classified punched cards it is only necessary to utilize a punched card controlled tabulating machine of the well known Hollerith type.

The construction and operation of such machines is already well known and is fully described in issued United States Letters Patent. The cards are passed through the machine in successive groups and a list of the amounts of each group is printed on a tape. Each group of cards is identified by having the designation pertaining to the compartment key selected also printed alongside of the related list. These classification designations change the control of the machine from listing to total printing to thereby print a total of each classified group of cards, or in other words, checks.

The checks can be conveniently sorted by hand and the accompanying list attached thereto so that as a final result the checks are now sorted and are provided with related lists.

Many banks now employ checks which are in the form of tabulating cards and are similar to paper checks with the exception of their size which is the dimension of a tabulating card. Card checks have the amounts written thereon and also have the printed classification number, like paper checks.

In utilizing card checks with the present machine the operator depresses the keys of the second keyboard to select a sorting compartment in accordance with the printed classification on the card check. The amount on the card check is mentally noted and after the card check is placed on the card carriage of the punch the keys of the ten-key keyboard are depressed to cause punching of the amount and the classification on the card check itself, in the same manner as if a tabulating card was prepared for each paper check. The punched card checks are then fed into the preselected sorting compartments.

Hereafter, when punched cards are referred to either in the claims or specification it is to be understood that card checks may be included in the broad designation, since the present machine may utilize such forms of checks.

It will be obvious, therefore, that the patented machine shown in the patent to Fuller 1,966,623 can be divested of mechanisms for totalizing and printing and the user of a tabulating machine can now be provided with the type of machine described herein which is simpler and less expensive to construct.

It is the main object of the present invention to provide a machine for punching record cards and a sorting mechanism for sorting the punched cards.

It is more specifically an object of the invention to provide a sorting machine under control of keys for selecting the sorting compartments and for controlling a punching machine for punching cards to represent the keys selected, and means for automatically conveying the punched cards to the preselected sorting compartments.

A still further object of the present machine is to provide means for controlling by the action of the ten-key keyboard the punching means so as to also cause the punching of amounts by the punching machine on the cards.

A still further object of the invention is to cause the punching of the designations pertaining to the predepressed compartment selecting key automatically by the operation of the punching machine.

Another object of the invention is to broadly provide a sorting machine with preselected compartments and a punching machine and means set in operation by the punching machine for automatically transporting the punched card to the feeding means for the sorting machine.

Another object of the present invention is to provide in its broadest aspects a feeding means for feeding a punched record to preselected sorting compartments, and means controlled by the physical presence of a punched record to cause the automatic operation of the feeding means.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In said drawings:

Fig. 2 is a view in side elevation of the bottom of the machine and shows particularly the sorting drum stopping devices for the machine.

Fig. 3 is a detail view of certain contact controlling devices.

Figure 7:
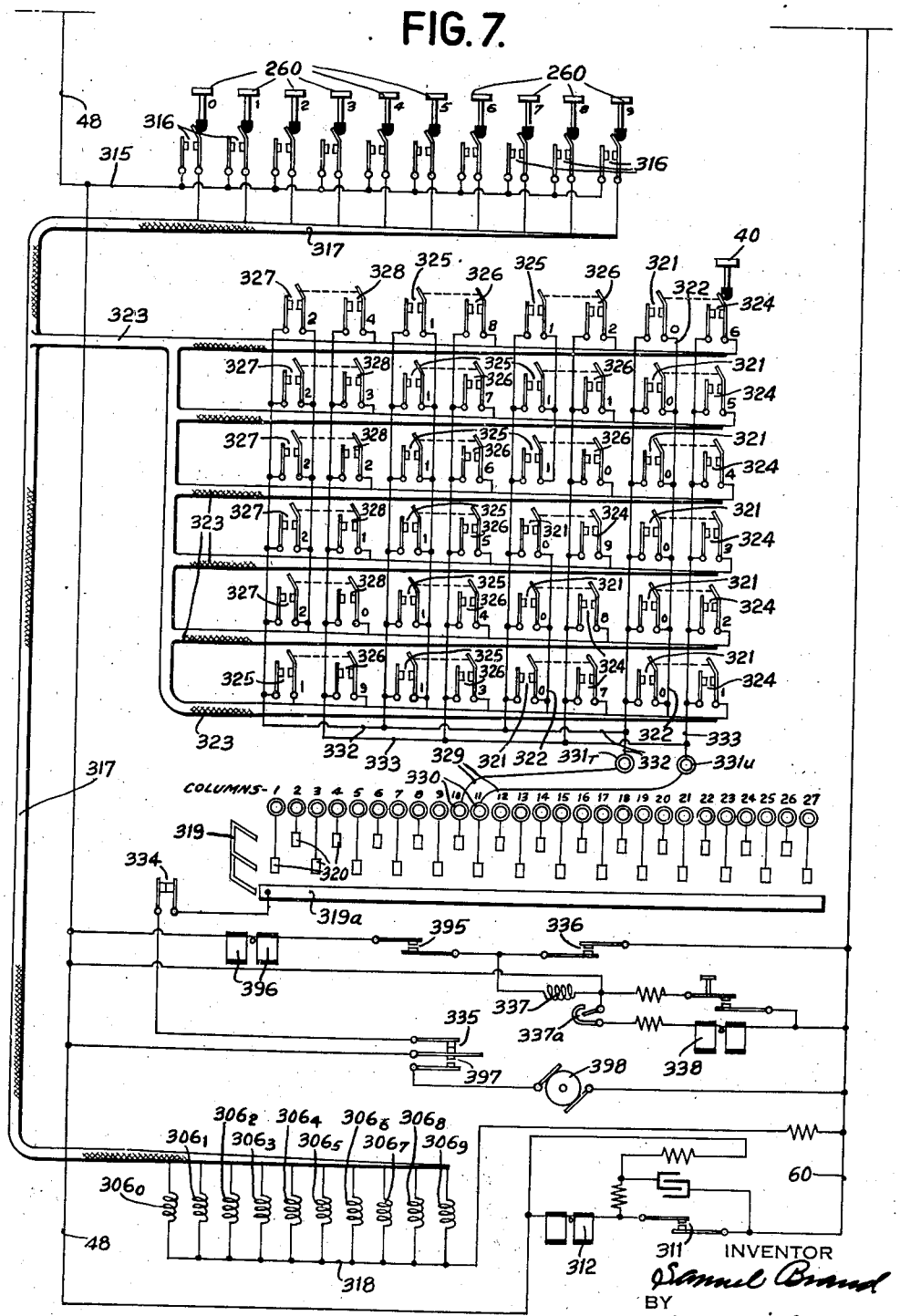

Figs. 6 and 7 with Fig. 6 on top shows an electrical wiring diagram of the machine, the electrical wiring for the sorting machine being shown in Fig. 6 and for the card punching attachment in Fig. 7.

Figure 8:
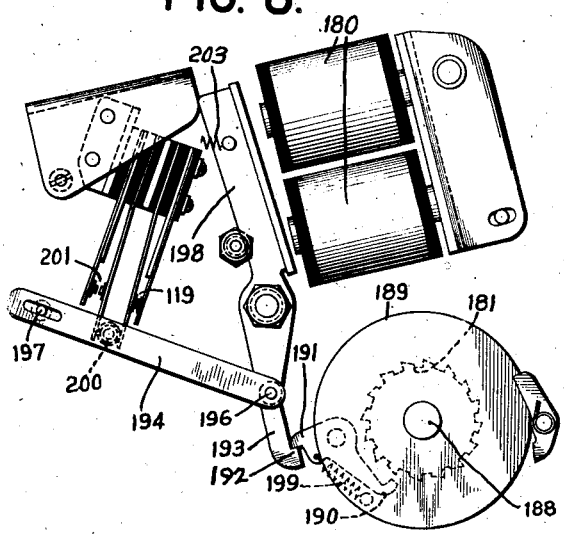

Fig. 8 is a view in side elevation of a one revolution clutch mechanism for the sorting machine.

Figure 9:
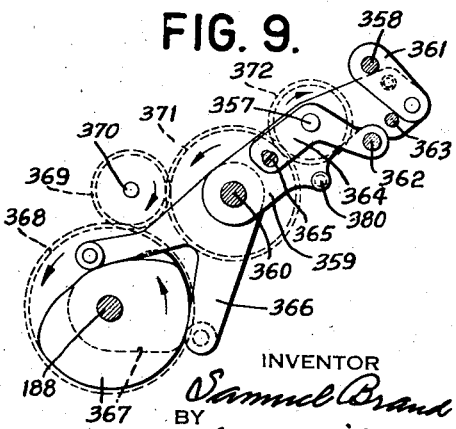

Fig. 9 is a view in side elevation of the frame carrying the punched card feeding rollers.

Figure 10:
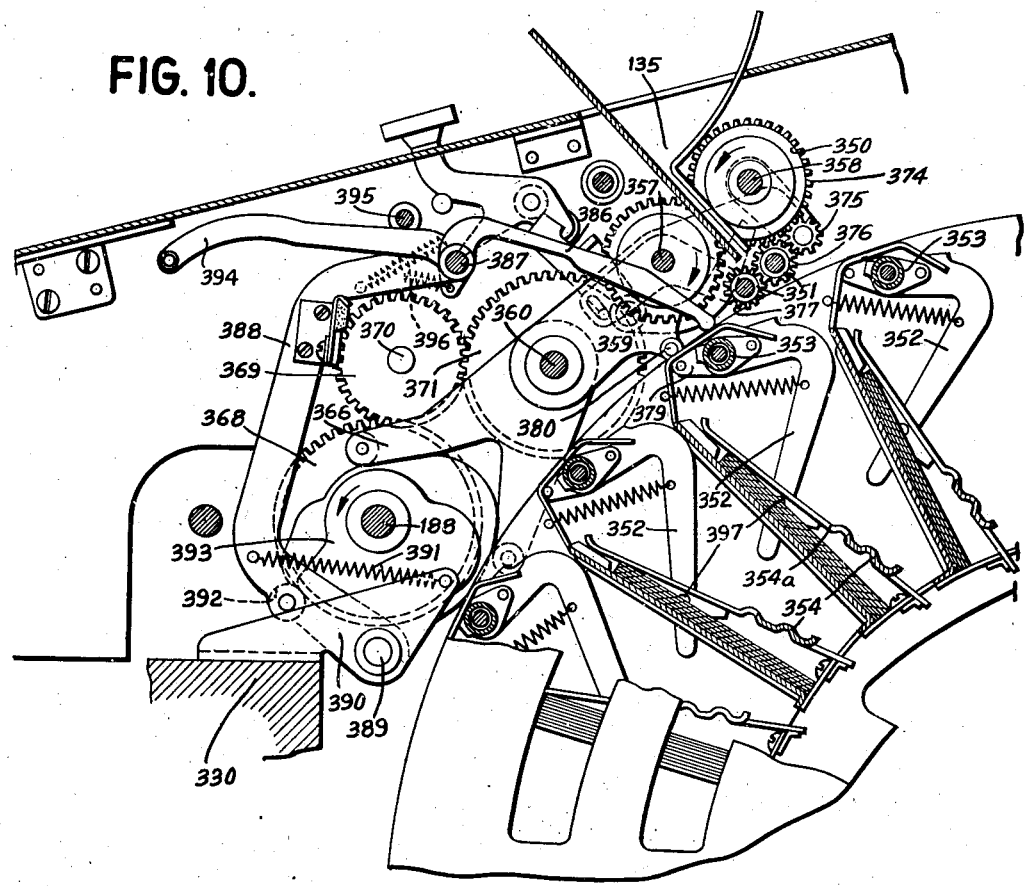

Fig. 10 is a fragmentary view in side elevation of the punched card feeding mechanism.

Figure 11:
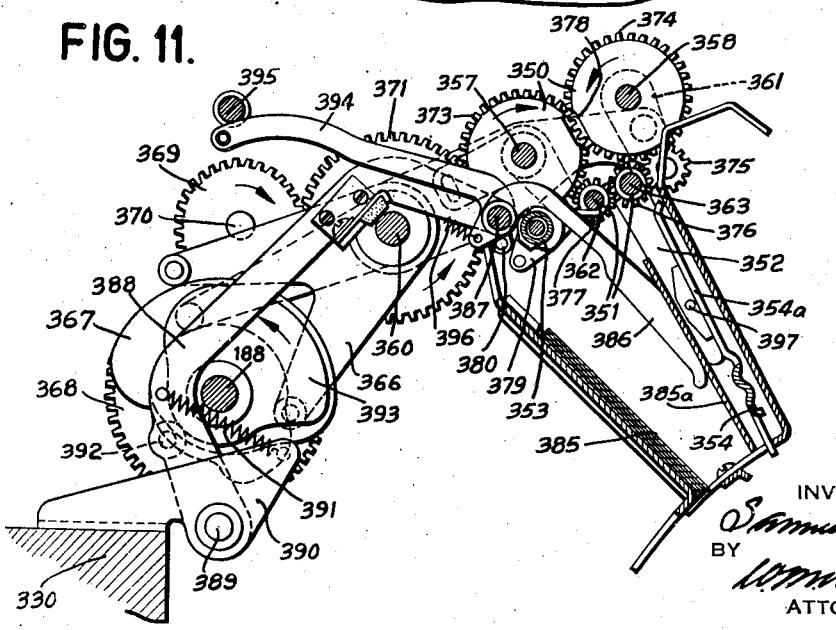

Fig. 11 is a view similar to Fig. 10 but showing certain parts in operated position.

Figure 12:
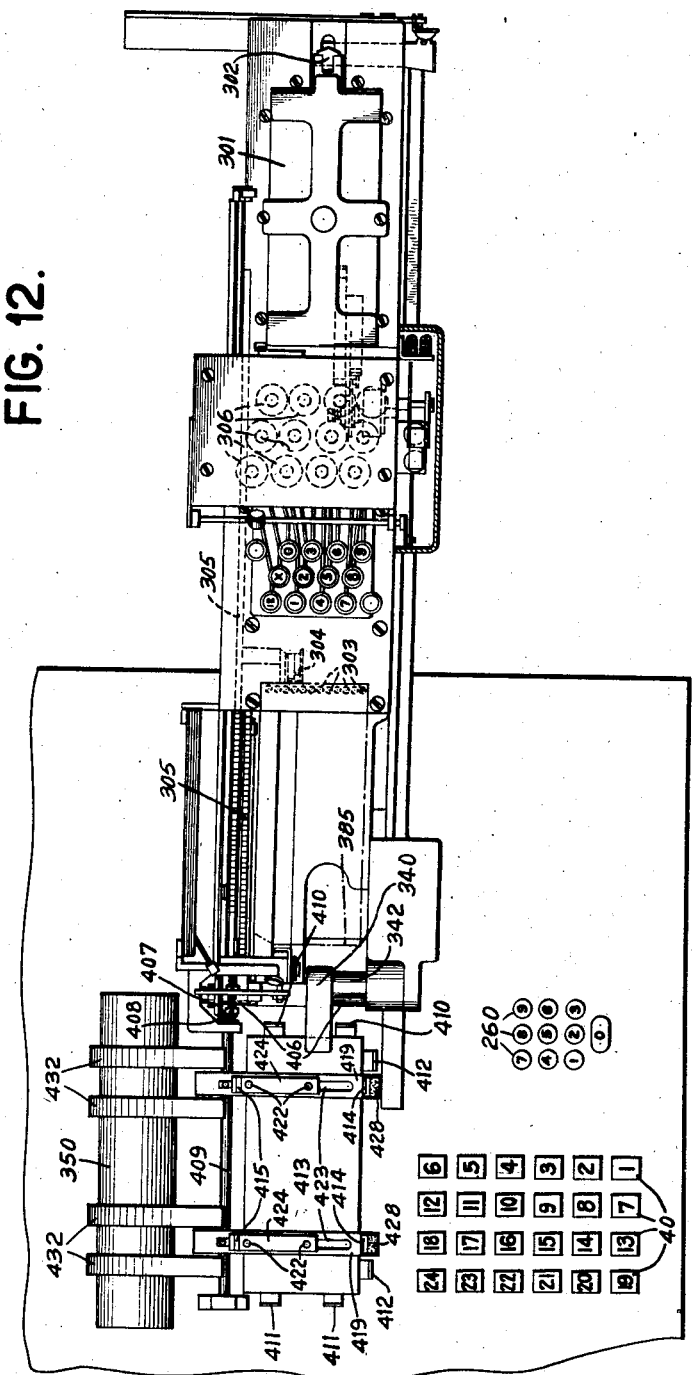

Fig. 12 is a plan view of the punching machine and shows it in its operative relation to the card sorting machine.

Figure 13:
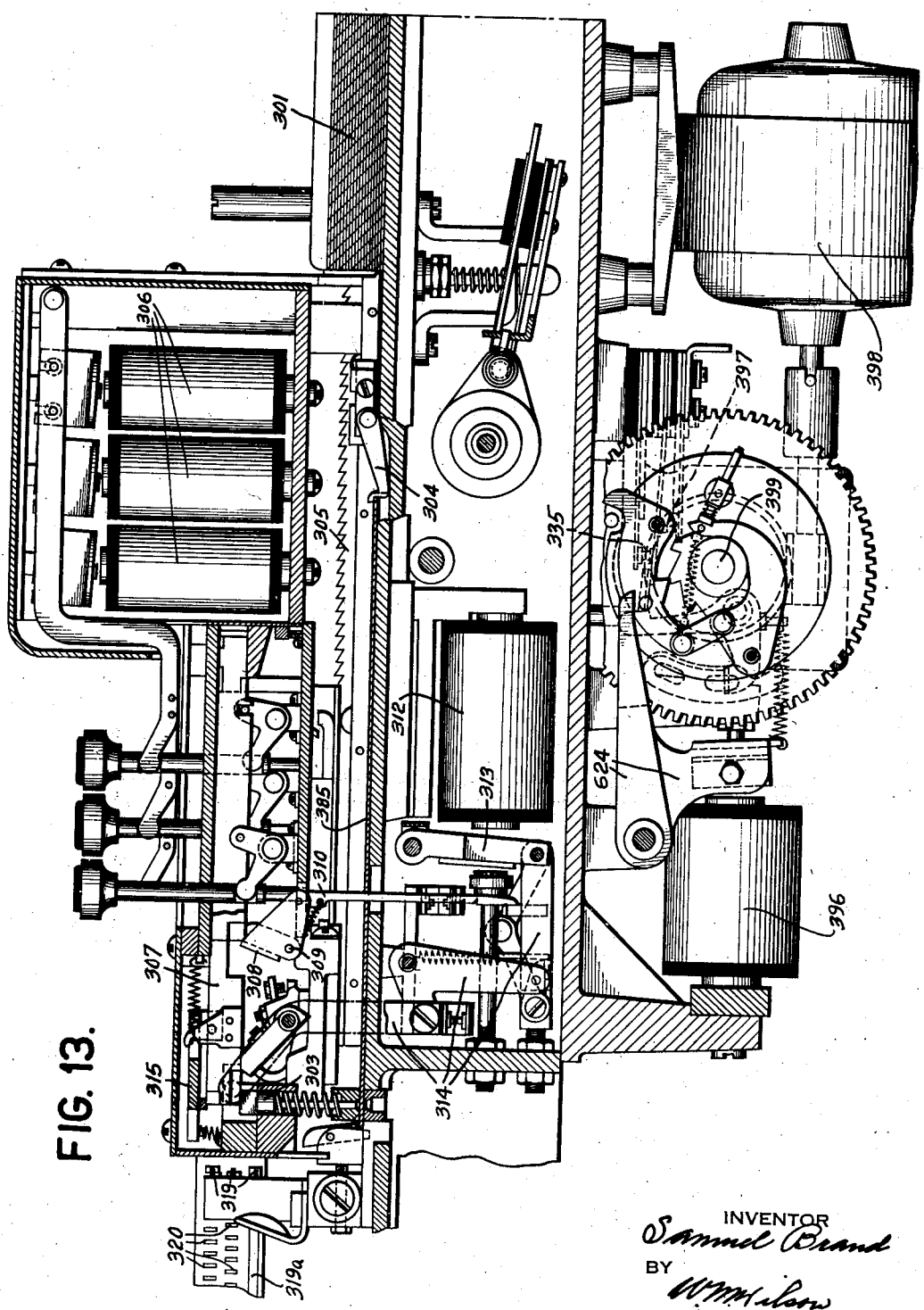

Fig. 13 is a sectional view of the punching machine with the casing shown cut away to show the interior.

Figure 14:
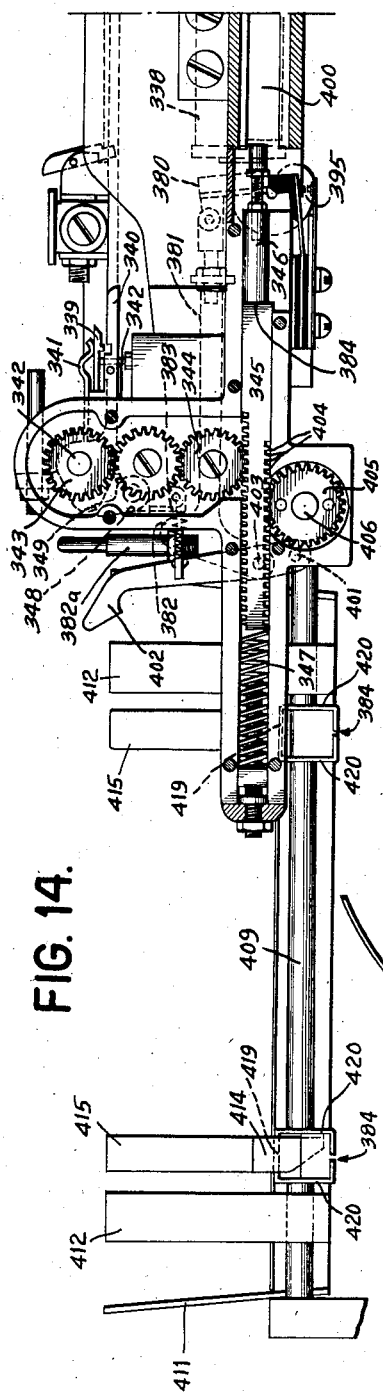

Fig. 14 is a sectional view of the left end of the punching machine and shows particularly the ejecting mechanism for ejecting the punched cards.

Figure 15:
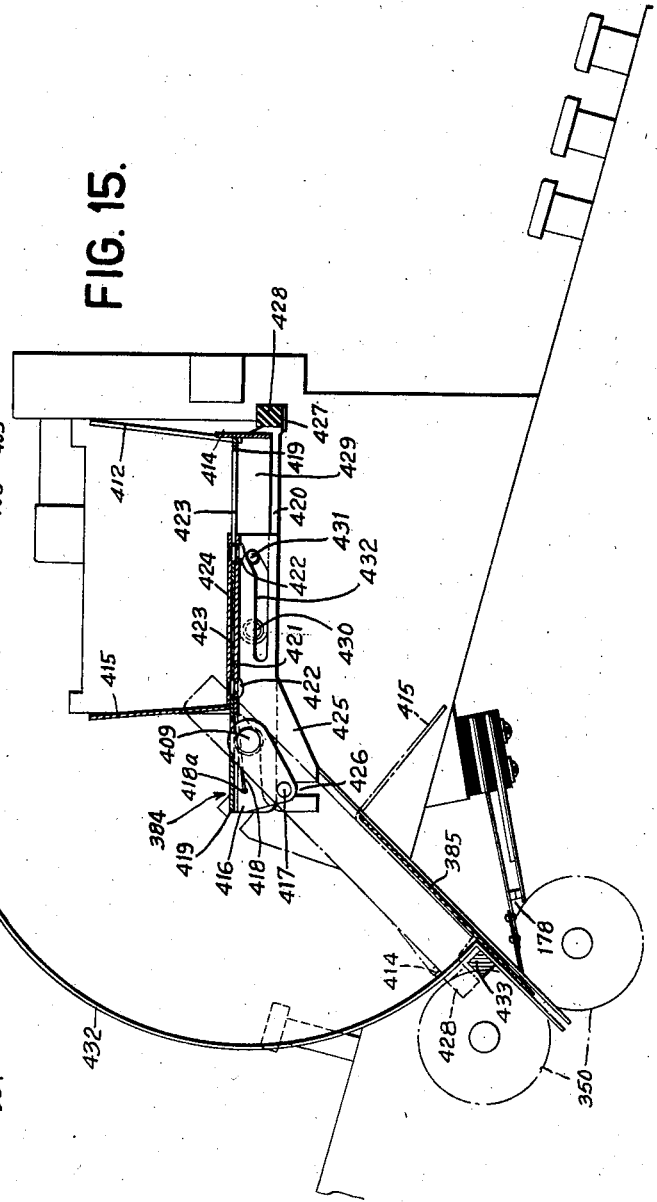

Fig. 15 is a sectional view showing the means for transporting the punched cards ejected from the punching machine to the feeding mechanism for feeding the punched cards to the selected sorting compartments.

In general the machine is provided with a sorting drum capable of rotating forwardly or backwardly under control of keys to select a sorting compartment, these keys being depressed according to the classification of checks. Thereafter the ten-key keyboard is manipulated to cause the automatic punching of amounts on the check by the punching machine. Thereafter the machine automatically punches the designation of the pre-depressed compartment selecting key. A further operation of the punching machine causes the punch carriage to be skipped and the punched card automatically ejected out of the punching machine and then flipped over to be inserted between the feeding rollers of the sorting machine. The punched card itself causes the closure of electrical contacts which energizes a clutch-control magnet so that a clutch is engaged to cause the feeding rollers to feed the punched card to the preselected sorting compartment. The machine operation can then be repeated for the preparing of another punched card according to the next check.

*Punched card sorting mechanism*

Figure 1:
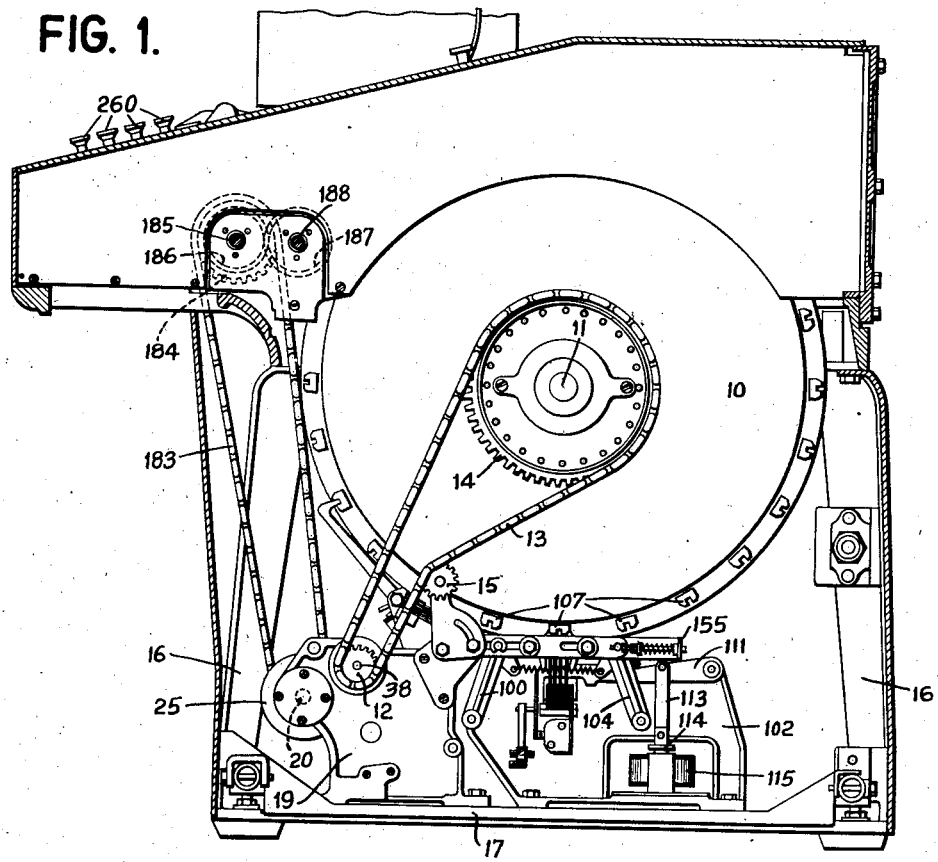
Fig. 1 is a view in side elevation of the right side of the punched card sorting machine.

Referring to Fig. 1, the sorting drum 10 is securely mounted on the shaft 11, suitably and rotatably supported in the main framework of the machine. The drum 10 is adapted to be driven by a continuous running motor (not shown) through a two-way clutch which drives a sprocket gear 12 (Figs. 1 and 2) in either direction. A chain 13 passes around sprocket gear 14 secured to the shaft 11. An adjustable idler gear 15 insures the proper tension on the chain 13.

The machine is mounted in a framework indicated generally at 16, and is supported on a base 17. The two-way clutch mechanism is mounted between a pair of brackets 18 and 19 secured to the base 17. The motor (not shown) is mounted on the base 17 and drives the clutch mechanism through a shaft 20 mounted in the brackets 18 and 19 and directly connected to the armature shaft of the motor. Secured to shaft 20 midway between the brackets 18 and 19 is a driving clutch member 21, comprising a pair of clutch plates 22 and 23, which rotates continuously with the shaft 20 in the direction indicated by the arrow in Fig. 4. Rotatably mounted on the shaft 20 adjacent the driving clutch members 21 are driven clutch plates 24 and 25, each provided with suitable clutch facing material indicated at 26.

The clutch plate 24 is mounted on a sleeve 27, which sleeve is also integral with a gear 28. The clutch plate 25 is similarly connected by a sleeve 29 to a gear 30 on the shaft 20.

The gear 28 meshes with an intermediate gear 36 which meshes with a gear 37 fast on a shaft 38 mounted in the brackets 18 and 19 and on which is secured the sprocket gear 12. The gear 30 meshes with a gear 39.

Obviously, if the clutch plate 24 is brought into operative contact with the driving plate 22, the clutch plate 24 and the gear 28 will be driven in a clockwise direction, and, through the gears 36, will drive the gear 37, shaft 38 and sprocket gear 12 also in a clockwise direction to rotate the drum 10 in the same direction. However, if clutch plate 25 is brought into contact with the drum plate 23, the plate 25 and the gear 30 are rotated clockwise. The gear 30 meshing directly with the gear 39 drives shaft 38 and sprocket gear 12 in a counterclockwise direction to rotate the drum 10 counterclockwise.

The selective movement of the clutch plates 24 and 25 to contact with the driving plate 22 is controlled by the position in which the drum stands and by the particular selector key 40 (Figs. 1 and 6) depressed. Fixed to the framework of the machine and surrounding the drum shaft 11 is a ring 41 (Fig. 6) of insulating material upon which is mounted a series of brushes 42 arranged annularly about the ring 41, there being a brush 42 for each selector key 40. Referring to Fig. 6, these brushes 42 are connected by wires 43 to one side of pairs of contacts 44 adapted to be closed upon depression of a selector key 40. A commutator, comprising conducting segments 45, 46, and 47, and a ring 49 shown diagrammatically in Fig. 6, mounted in a disk 49' of insulating material is fixed to the drum shaft 11 adjacent the ring 41. The brushes 42 are carried by the ring 41 and contact with the segments 45, 46, and 47. When the drum 10 is at rest, the segment 45 is in contact with the brush 42 connected to the contacts 44 associated with the last depressed selector key 40 shown in Fig. 1 as the "1" key at the left. The segment 46 is electrically connected to the ring 49 by a radial strap of conducting material.

Assuming that the main switch (not shown) is closed and the motor is running with the sorting drum standing at the last selected position, for example, the "1" position, we now depress the "13" compartment selector key 40 (see Fig. 6). Depression of this key releases the "1" key which as is clearly explained in the aforementioned Patent #1,966,623 is immediately returned to undepressed position opening the corresponding contacts 44. Depression of the "13" key 40 closes its contacts 44, whereupon a circuit is set up from a line 48 connected to one side of the current supply, wires 52, 53, and 54, contacts 44 for the "13" compartment key, wire 43 to the corresponding brush 42, segment 46, ring 49, a brush 55, wire 56, relay contacts 71a (now closed), wire 58, relay magnet 59 to the other side of the current supply by a line 60. This energizes relay magnet 59 which closes its relay contacts 59a and 59b, establishing a holding circuit by relay contacts 59b for relay magnet 59 extending as follows: from line 48, wire 52, wire 52, relay contacts 159a now closed since relay magnet 159 is now energized, wire 69, contacts 59b, relay magnet 59, to line 60. Closing of relay contacts 59a establishes a circuit from line 48, wires 52 and 53, relay contacts 159a (now closed), wire 69, relay contacts 59a, wire 70, relay magnet 71, wire 72, to line 60.

Energization of relay magnet 71 opens relay contacts 71a and 71b, and closes relay contacts 71c closing a circuit by the latter from line 48, wires 52 and 53, relay contacts 71c (now closed), clutch control magnet 75, contacts 76 and 77 closed by means to be later described, to line 60. This energizes the clutch control magnet 75.

Figure 4:
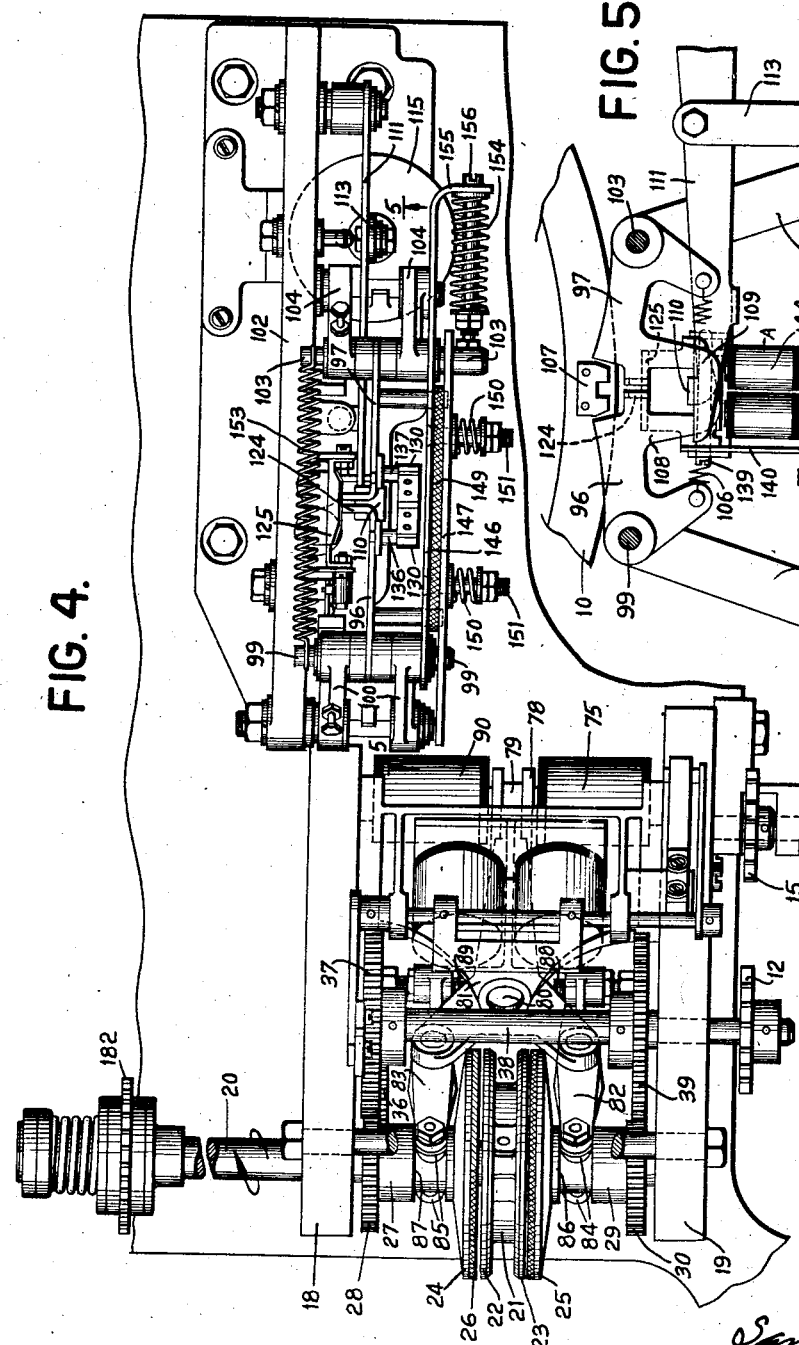
Fig. 4 is a plan view of the mechanism shown in Fig. 2.

Referring now to Fig. 4, when the clutch control magnet 75 is energized it attracts its armature 78 which is carried on the end of a lever 79 pivoted at 80 on a bracket 81 mounted between the brackets 18 and 19. This rocks the lever 79 clockwise (Fig. 4).

Pivotally carried by the levers 79, at the end opposite the armature 78, is a pair of yokes 82 and 83. These yokes carry rollers 84 and 85 projecting into annular grooves 86 and 87 in the sleeves 29 and 27 respectively. At their opposite ends the yokes 82 and 83 carry adjusting studs 88 and 90 bearing against the bracket 81.

When the lever 79 is rocked clockwise under the influence of clutch control magnet 75, it rocks the yoke 82 also clockwise, bringing the clutch plate 25 into contact with the driving member 23, whereupon the gear 30 is driven clockwise (Fig. 2) rotating gear 39 and sprocket gear 12 counterclockwise to rotate the drum 10 in the same direction until the segment 45 contacts the brush 42 associated with the depressed key, in the instant example, the "13" key. The drum is stopped in this position by mechanism later to be described.

Assuming now that the "12" selector key 40 is depressed instead of the "13" key with the "1" key previously depressed. When the drum 10 is standing in the "1" position the drum will rotate in the opposite or clockwise direction to bring the "12" compartment into registry with the punched card feeding aperture.

Referring to Fig. 6, it may be seen that the brush 42 connected to the "12" key contacts 44 is in contact with the segment 47. This segment 47 having no connection to the ring 49 is ineffective to energize the relay magnet 59 or the relay magnet 71, therefore, upon closure of contacts 76 and 77 by means to be later described a circuit is established from line 48, wires 52 and 53, relay contacts 71b, a second clutch control magnet 90, contacts 76 and 77 closed by means to be later described, to line 60.

Energization of magnet 90 rocks the arm 79 (Fig. 4) counterclockwise, engaging the clutch plate 24 with the driven plate 22, which, through the gears 28, 36 and 37 rotates the sprocket gear 12 and the drum 10 clockwise until the segment 45 contacts the brush 42 for the "12" key 40.

Figure 5:
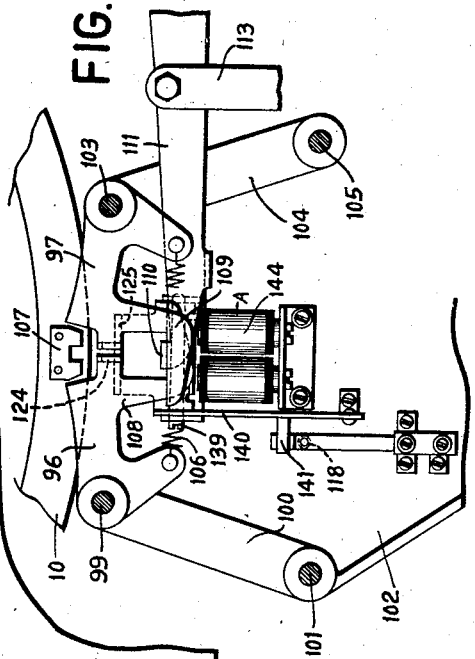
Fig. 5 is a detail view of certain parts forming part of the sorting drum stopping devices.

The drum 10 is normally held in position by a pair of stop arms 96 and 97 (Figs. 4 and 5) and is also accurately alined in position by a lock arm 98 (Fig. 2). The stop arm 96 is pivotally supported at 99 (Fig. 4) by a pair of arms 100 pivoted on a stud 101 projecting from a frame 102 secured to the base 17. The stop arm 97 is similarly supported at 103 by a pair of arms 104 pivoted on a stud 105 in the frame 102. A spring 106 stretched between projections of the arms 96 and 97 normally holds these arms in their effective or raised positions.

The stop arms 96 and 97 cooperate with blocks 107 secured to the side of the drum 10, there being a block 107 for each compartment position on the drum. Before the drum can be rotated, it is necessary to withdraw the arms 96 and 97 clear of the particular block 107 between said arms. To this end the stop arms 96 and 97 are provided with hooked projections 108 and 109 respectively. Extending immediately above these projections is an ear 110 bent over from the free end of a lever 111 pivoted on a stud 112 (Fig. 2) in the frame 102. A link 113 pivotally connected to the lever 111 has secured to its lower end the armature 114 of a solenoid 115.

Energization of the solenoid 115 attracts its armature 114, drawing the link 113 downwardly and rocking the lever 111 counterclockwise. This movement of the lever 111, through the ear 110, rocks the stop arm 96 clockwise and the stop arm 97 counterclockwise, thus moving said stop arms out of the path of the block 107 with which it is engaged.

The solenoid 115 is energized by the following circuit described with reference to Fig. 6:

This circuit extends from line 48, wires 52, 53, wire 54 at the right, relay contacts 116a closed in a manner now to be explained, solenoid 115, normally closed relay contacts 117a, normally closed contacts 119, normally closed contacts 118 to line 60. This circuit is normally open at the relay contacts 116a, held open by a relay magnet 116, which is retained energized as long as a key 40 is depressed and the drum stands at a position corresponding to the depressed key. The circuit for retaining relay magnet 116 energized extends as follows, assuming the "1" key to be depressed as shown in Fig. 6, line 48, wires 52, 53 and wire 54 at the left, contacts 44 for the "1" key, wire 43 to the "1" brush 42, segment 45, ring 120, a brush 121, wires 122 and 123, and relay magnet 116 to line 60.

When another key is depressed, the previously depressed key, in this example the "1" key is immediately released and restored to its undepressed position permitting its contacts 44 to open. This opens the circuit through the relay magnet 116 which, becoming deenergized, permits its relay contacts 116a to close establishing the above described circuit through the solenoid 115.

As the latch arms 96 and 97 approach the lower limit of their movement caused by the energization of solenoid 115, ears 124 formed on the free ends thereof, come below the bent end of a latch arm 125 (see Fig. 3), which arm is immediately rocked clockwise (Fig. 3) by a spring 126 to latch the stop arms 96 and 97 down in their ineffective positions.

Before the drum 10 is free to rotate, the lock arm 98 must also be removed to ineffective position. The nose of this arm as shown in Fig. 2 normally rests in a notch formed in one of the blocks 107. The lock arm 98 is withdrawn by a magnet 127 (Figs. 2 and 6) which is energized, under control of the stop arms 96 and 97 when they are withdrawn to free the drum for rotation. Mounted near the stop arms 96 and 97 are pairs of contacts 128 and 129 connected in parallel and having their inner blades bent outwardly at an angle (see Fig. 2). These angular ends of the inner blades carry blocks 130 of insulating material (Fig. 4). Studs 136 and 137 (Fig. 4) projecting respectively from the stop arms 96 and 97, cooperate with the blocks 130 (see also Fig. 6) to hold the pairs of contacts 128 and 129 open when the stop arms are in their effective positions. When the stop arms 96 and 97 are pulled down to unlock the drum 10, the studs 136 and 137 are carried out of contact with the blocks 130, whereupon the contacts 128 and 129 are closed by the spring tension of the blades.

Closure of contacts 128 or 129 (see Fig. 6) or both energizes magnet 127, which attracts its armature 138 (Fig. 2) and rocks the lock arm 98 clear of the block 107.

It was set forth above how, as the stop arms 96 and 97 approach the limit of their downward movement the latch 125 (Fig. 3), under the influence of its spring 126, rocks clockwise to latch arms 96 and 97 down. The arm 125 is pivoted at 139 and has a downwardly extending tail 140 to which the spring 126 is attached. The tail 140 carries an insulating roller 141 which cooperates with the center one of three contact blades. As viewed in Fig. 3 the right hand pair of contacts 118 (see also Fig. 6) is normally closed and the left hand pair of contacts 77 are normally open. As the latch arm 125 rocks clockwise to latch the stop arms 96 and 97 down, the tail 140 through the roller 141 opens contacts 118 and closes contacts 77. When the contacts 118 are opened, the solenoid 115 (Figs. 2 and 6) is deenergized, allowing a spring 142 (Fig. 2) to raise the arm 111, link 113 and armature 114 to their upper positions.

Closing of contacts 77 completes the circuit through the selected clutch control magnet 75 or 98 upon closure of contacts 76. These latter contacts are closed by a tail 143 (Fig. 2) secured to the lock arm 98 and rocked therewith. Contacts 76 are, therefore, closed when the lock arm 98 is rocked clear of the block 107. The drum 10 is then free to rotate and the proper one of the clutch control magnets is energized to drive the drum to its newly selected position.

The drum continues to rotate until it arrives at the position wherein the compartment corresponding to the depressed key comes opposite the punch card receiving aperture 135 (Fig. 10), whereupon the rotation of said drum is arrested and the drum is accurately alined in position by mechanism now to be described.

It will be remembered that the commutator comprising the segments 45, 46, 47 and rings 49 and 120 (Fig. 6) rotates with the drum 10, whereas the disk 41 together with the brushes 42, 55 and 120 remain stationary. As soon as the segment 45 contacts the brush 42 corresponding to the depressed key, a circuit is established from line 48, wires 52, 53, and wire 54 at the left, contacts 44 of the depressed key, corresponding wire 43, brush 42, segment 45, brush 121, wire 122, and a magnet 144 to line 60. Energization of magnet 144 (see Fig. 3) attracts its armature 145, which is secured to the latch arm 125, rocking the latter counterclockwise to free the stop arms 96 and 97. The spring 106 (Figs. 2 and 5) immediately throws the stop arms upwardly to effective drum locking position. If the drum 10 is rotating in a clockwise direction, the block 107 wipes over stop arm 97 and strikes arm 96. If rotating counterclockwise, the block 107 wipes over arm 96 and strikes stop arm 97.

A slide 146 (Fig. 4) is pivoted at its left hand end on the stud 99 on which the stop arm 96 is pivoted. The slide 146 is slotted to surround and slide over the stud 103 so that as the stud 99 moves to the left the slide 146 moves in the same direction. Similarly, a slide 147 has one of its ends pivoted on the stud 103 on which is pivoted the stop arm 97. The slide 147 is slotted at 148 (Fig. 2) to slide over the stud 99 so that as the stud 103 moves to the right the slide 147 moves in the same direction. Between the slides 146 and 147 is fixedly mounted a friction plate 149 of suitable friction producing material. The slides 146 and 147 are pressed against friction plate 149 by springs 150 surrounding studs 151 carried by the slide 146 and projecting through slots 148 and 152 in slide 147. The studs 151 pass through holes in the friction plate 149 to hold it in position between plates 146 and 147.

Between the studs 99 and 103 is stretched a spring 153 (Fig. 4). Another spring 154 is compressed between the stud 103 and the bent end 155 of the slide 146. The spring 154 surrounds a pivot stud 156 secured to the stud 103 and which passes through the bent end 155 of the slide 146.

Assuming, for example, that the drum 10 is rotating counterclockwise, the block 107 strikes the stop arm 97 (Fig. 2) moves the slide 147 to the right. The shock of the blow is absorbed by the friction between the slide 147 and friction plate 149 and by the extension of spring 153 and compression of spring 154, which springs react to bring the block 107 and the drum to the position wherein the selected compartment is in registry with the punched card receiving aperture 135 (Fig. 10). When the block 107 strikes the stop arm 97, it stretches spring 153 (Fig. 4) and compresses spring 154 (Figs. 2 and 4) and block 107 then rebounds against arm 96 and when block 107 strikes the stop arm 97 the action just described, occurs but to a lesser degree. This rebound or "chatter" would be quite extensive if only the springs 153 and 154 were depended upon to bring the drum to rest. The friction member 149 is provided to dampen the rebound action effected by the springs 153 and 154.

It is necessary that the lock arm 98 (Fig. 2) be maintained in its ineffective position until the drum 10 has come to a complete rest. This is effected by maintaining one or the other of the contacts 128 and 129 closed until the drum is completely stopped. This maintains the magnet 127 (Fig. 6) energized to hold the arm 98 in its disengaged position. When the block 107 strikes the stop arm 97, this arm, as stated above, is moved to the right (Figs. 2 and 4) carrying the stud 137 therewith away from the insulating block 130. This permits contacts 129 to remain closed. When the springs 153 and 154 rebound, carrying the drum 10 and block 107 back past center, said block 107 strikes the stop arm 96 moving it slightly leftward, at which time the stud 136 is carried away from the insulating block 130. This permits contacts 128 to close. Thus, if the block 107 is off center in either direction, one or the other of the contacts 128 and 129 is closed. As soon as the drum comes to a complete rest, both contacts 128 and 129 are opened, deenergizing the magnet 127, whereupon the lock arm 98 is rocked clockwise by a spring 98a accurately to align the drum.

The instant the segment 45 (Fig. 6) comes into contact with the brush 42 corresponding to the depressed key, the magnet 144 (see also Fig. 3) is energized over the circuit previously traced in order to release the stop arms 96 and 97. Energization of magnet 144 rocks the arm 140 counterclockwise (Fig. 3) or clockwise in Fig. 6 closing contacts 118 and opening contacts 77. This opens the circuit through the selected clutch control magnet 75 or 90. A holding circuit is provided for the selected clutch control magnet, since it is desired to rotate the drum 10 by power until an instant before the block 107 strikes the stop arm 96 or 97, depending on the direction of rotation of the drum. This holding circuit is set up as follows:

The relay magnet 116 remains energized so long as the drum is stationary at the selected compartment position. By the energization of the relay magnet 116 relay contacts 116b (Fig. 6, near lower left hand corner) are closed, closing a circuit from line 48, contacts 116b, wire 158, a relay magnet 159 to line 60. This holds the relay magnet 159 energized holding contacts 159a and 159b open. Upon depression of another key, as set forth above, the circuit through relay magnet 116 is opened causing this relay magnet to be deenergized allowing relay contacts 116b to open. The deenergization of relay magnet 159 permits its relay contacts 159a and 159b to close. It was described above how relay contacts 159b provided a holding circuit over wire 69, relay contacts 59b, for relay magnet 59 and also caused relay magnet 71 to be energized. Closure of relay contacts 159b causes the energization of a clutch holding relay magnet 166 by a circuit described as follows: line 48, wires 52 and 53, relay contacts 159b, wire 167, relay magnet 166, wires 168 and 169, contacts 76 and 77 (now closed) to line 60. Relay magnet 166 closes its relay contacts 166a and 166b, the relay contacts 166a establishing a holding circuit for the selected clutch magnet 75 or 90 over wire 169, relay contacts 166a, a wire 172 to line 60. The contacts 166b establish a second holding circuit for the relay magnet 59 extending from line 48, wires 52 and 53, wire 173, relay contacts 166b, wire 69, relay contacts 59a, relay magnet 59 to line 60. This circuit from wire 69 extends also through relay contacts 59a, wire 70, relay magnet 71, wire 72 to line 60, and holds the magnet 71 energized.

When the segment 45 contacts the particular brush 42 corresponding to the depressed key, the block 107 (Fig. 2) is some distance from the point midway between stop arms 96 and 97. However, at this instant, the magnet 144 (Fig. 6) becomes energized opening by roller 141 contacts 76, which would open the circuit for the selected clutch control magnets 75 and 90 were it not for the holding circuit over wire 169, relay contacts 166a, and wire 172 to line 60.

At the same time that the magnet 144 is energized, the relay magnet 116 is energized closing relay contacts 116b. This energizes relay magnet 159, opening relay contacts 159a and 159b. The relay contacts 159a open the circuit to relay magnet 59 over wire 69, relay contacts 59b, relay magnet 59 to line 60. The relay magnet 59 is maintained energized for a brief period over wire 173, relay contact 166b, wire 69, relay contacts 59b, relay magnet 59 to line 60. This holds the relay contacts 59a closed and the relay magnet 71 energized.

Opening of relay contacts 159b, however, opens the circuit to relay magnet 166 which, becoming deenergized, allows its relay contacts 166a and 166b to open; the contacts 166b opening the circuit through the selected clutch control magnet 75 or 90, and the contacts 166b opening the circuit through relay magnets 59 and 71. The contacts 59a and 59b thereupon open and the relay contacts 71c open and relay contacts 71b close. After relay contacts 77 open due to the energization of the magnet 144, the delay due to energizing relay magnets 116 and 159 and deenergizing relay magnet 166 is sufficient to maintain the selected clutch magnet 75 or 90 energized until an instant before the block 107 strikes the stop arm 96 or 97.

It is to be understood as previously stated that the relay magnets 59 and 71 are energized only when the drum 10 rotates counterclockwise, that is, when a key in the group 13-24 is depressed. If a key 1-12 inclusive is depressed the circuit will extend to the segment 47 but since it has no connection to the ring 49, no circuit is established over wire 56, relay contacts 71a, wire 58 and relay magnet 59 to line 60. Thus, relay magnet 59 is not energized, relay contacts 59a remain open and relay magnet 71 is not energized. Contacts 71b remaining closed cause energization of clutch control magnet 90. The functions of relay magnets 159 and 166 are the same whether clutch control magnet 75 or 90 is selected.

*Card control of punched card feeding operations*

Card feeding operations are rendered operative when a magnet 180 is energized. As will be later described the feeding of a punched card will initiate the operation of the card feeding mechanism. The feeding of a punched card causes the closure of contacts 178 (see Fig. 15) and this completes a circuit, as shown in Fig. 6, from the line 48, through relay contacts 116b, now closed since the drum is at rest, contacts 178, relay contacts 179a now closed, clutch control magnets 180 to the line 60 thus causing the energization of the magnets 180.

Referring to Fig. 8 there will be seen a showing of a ratchet clutch wheel 181 which continually rotates by driving means now to be described. Secured to the drive shaft 20 is a sprocket gear 182 (Fig. 4) around which passes an endless chain 183 (Fig. 1) surrounding a sprocket gear 184 attached to a shaft 185. Attached to said shaft is a pinion 186 meshing with a gear 187 loosely mounted on a shaft 188 and to which gear 187 the ratchet wheel 181 is secured (see Fig. 8).

Attached to the shaft 188 is a disk 189 carrying a spring-pressed clutch pawl 190 having a tail 191 normally engaged by a shoulder 192 of a clutch control arm 193. A slidable plate 194 is pivoted to the clutch control arm 193 by a pin 196 carried by the arm 193, said plate 194 also having a slot receiving a pin 197 carried by the machine frame.

From Fig. 8 it will be seen that the armature 198 of magnets 180 is integral with the arm 193 so that the energization of magnets 180 will rock the clutch control arm 193 to remove shoulder 192 from the tail 191 thereby permitting a spring 199 to rock the clutch pawl 190 into engagement with the ratchet wheel 181 thus rotating the drive shaft 188.

When the slidable plate 194 is moved rearwardly a pin 200 carried thereby will close safety contacts 201 and said contacts as shown in Fig. 6 shunt relay contacts 116b thereby maintaining the circuit to magnets 180 closed in the event that relay contacts 116b may open by the energization of relay magnet 116 caused by the depression of another selector key.

It should further be noted that when the plate 194 is shifted by the energization of magnets 180 the pin 200 carried by the plate 194 will permit contacts 119 to open (see Fig. 6 upper right) thus opening the circuits to the line 60 and making the reel selecting mechanism inoperative during the punched card feeding operation.

At about half the rotation of shaft 188 the card feeding mechanism to be described hereinafter has fed the card past the contacts 178 and opening the latter, but the circuit to magnets 180 is nevertheless held closed by contacts 201.

At about 250° rotation of the shaft 188 a cam 202 carried thereby will close cam contacts CC—1, thereby closing, as shown in Fig. 6 a circuit to relay magnet 179. The latter will now open the relay contacts 179a, thereby opening the circuit to the clutch control magnets 180.

It will be seen that a spring 203 will rock the armature 198 and clutch release arm 193 when magnets 180 are deenergized so that at the completion of one revolution of the disk 189 and shaft 188 the shoulder 192 of the arm 193 will engage the clutch pawl 190 and disengage it from the ratchet wheel 181.

*Punched card feeding mechanism*

After the drum 10 has been positioned according to the selector key 40 depressed, the punched tabulating card 385 to be sorted is automatically inserted by means to be later described into an aperture 135 (Fig. 10) and the clutch mechanism just described is energized to cause it to be fed into the selected compartment.

The tabulating cards are fed into the compartments by means of a plurality of pairs of feed rollers 350 and pairs of smaller rollers 351 (Figs. 10 and 11). These feed rollers normally occupy the position with relation to the sorting drum, in which they appear in Fig. 10. During the rotation of the card feeding rollers to feed a punched card into a selected compartment the rollers 350 and 351 are rocked downwardly to the position shown in Fig. 11. The pairs of rollers 350 are secured to the shafts 357 and 358 (Figs. 10 and 11), the shaft 357 being carried between a pair of frame plates 359 (see also Fig. 9) secured to a shaft 360 journaled in suitable side frames of the machine. The shaft 358 is carried between upwardly extending brackets 361, one secured to each of the pair of frame plates 359. The rollers 351 are carried on shafts 362 and 363, the latter shaft being supported between the frame plates 359 and the shaft 362 being supported between adjustable brackets 364 pivoted on the shaft 357 and adjustably secured to the frame plates 359 by screws 365 (see Fig. 9).

Also secured to the shaft 360 is a cam follower arm 366 carrying rollers cooperating with a pair of complementary cams 367 secured to the shaft 188 (Figs. 9, 10, and 11) which, it will be remembered, receives one complete counterclockwise rotation at each operation of the machine. At the proper time the cams 367 rock the shaft 360 and the frame plates 359 clockwise to bring the rollers 351 into close proximity to the selected compartment and at the same time a gear 368 (Fig. 10) fast on the shaft 188 rotates the rollers 350 and 351 in the directions indicated by the arrows through the following described train of gears: The gear 368 drives an intermediate gear 369 mounted on a stud 370. The gear 369 meshes with a gear 371 loose on the shaft 360, which gear 371 meshes with a gear 372 (Fig. 9) fast on the shaft 357. A gear 373 (Fig. 11) also fast to the shaft 357 meshes with a gear 374 fast on the shaft 358. The counter-clockwise rotation of the gear 368 through the train of gears 369 and 371 rotates the gear 372, the shaft 357 and the roller 350 fast thereon in a clockwise direction, and also rotates the gear 374, shaft 358 and the feed roller 350 on this shaft in a counterclockwise direction. The gear 374 (Fig. 11) meshes with an intermediate gear 375 which in turn meshes with a gear 376 secured to the shaft 363, and the gear 376 meshes with a gear 377 fast on the shaft 362. This causes the feed rollers 351 on the shaft 363 to rotate counterclockwise and the feed rollers 351 on shaft 362 to rotate in a clockwise direction.

The rollers 350 are notched substantially as shown at 378 (Fig. 11) so that when the card is dropped into the aperture in the chute 135 (Fig. 10) the lower edge thereof rests on the shoulders of the notch 378 substantially between the set of rollers 350 permitting an initial rotation of the rollers 350 before the punched card is fed thereby. The rotation of rollers 350 and 351 in the direction of the arrows feeds the punched card into the selected compartment.

As the punched cards 385 are fed into the compartment by rollers 351 they are held fed between a retainer plate 354, and a series of fingers 386 (Figs. 10 and 11) which are secured to a rod 387 carried by a pair of arms 388. The arms 388 are secured to a shaft 389 pivotally supported on brackets 390 (only one of which is shown) secured to a sub-base 330. Springs 391 normally urge the arms 388 clockwise pressing rollers 392 carried by the arms 388 against cams 393 fast on the shaft 188.

The fingers 386 are normally in the Fig. 10 position and when the shaft 188, and consequently the cams 393 are rotated counterclockwise, the contour of the cams 393 permits the springs 391 to rock the arms 388 quickly clockwise from the Fig. 10 position to the position in which they appear in Fig. 11 to position the fingers 386 in the compartment. Arms 394 are secured to the shaft 387 and are urged by springs 396 attached to the extensions of fingers 386 to cause the arms 394 to be urged against a guide rod 395 so that as the fingers 386 are moved into the compartment they are guided by the arms 394 cooperating with grooves in said guide rod 395.

When the selected compartment comes into a punched card receiving position an arm 379 comes to rest adjacent a roller 380 (Figs. 10 and 11) carried by one of the frame plates 359. After the fingers 386 are moved into the compartment as shown in Fig. 11 the frame plates 359 are rocked by the cams 367 as previously stated and a roller 380 rocks an arm 379. The arm 379 is connected to an arm 352 by a sleeve 353 so as to rock arm 352 counterclockwise against the action of a spring 355 carrying the card retainer plate 354 which is pivoted to said arm 352 at 397 from the position in which it appears in Fig. 10 to the position in which it is shown in Fig. 11. By means of slots 354a in the retainer plate 354 the latter is moved past the fingers 386 which are now in the compartment so that the incoming punched card 385 may be fed between the plate 354 and fingers 386 by the rollers 351 which are now rotating. Reference character 385a in Fig. 11 indicates a punched card fed in a compartment to show how it is fed between the plate 354 and fingers 386.

After the punched card is fed in the compartment between the fingers 386 and the retainer plate 354, the cams 393 restore the arms 388 to their original position withdrawing the fingers 386 from the compartment. The cams 367 then rock the frames 359 counterclockwise, carrying the feed rollers outwardly to their normal positions and this allows the spring 355 to carry the retainer plate 354 against the stack of punched cards 385 to firmly hold the card fed into the compartment wall plate or against the punched cards already in the compartment.

*Card punching machine*

After the selector key 40 has been depressed and the selected sorted compartment is at the punch card receiving position keys 260 (Fig. 12) are depressed. These ten keys correspond to the keys designated 205 in the patent to F. L. Fuller, No. 1,966,623, and constitute the ten keys of an adding machine which are depressed according to the amount of the check for which a punched card is prepared. These keys, as shown in the patent, control the printing and totalizing of the amounts and in the present machine control the punching of amounts on a tabulating card which is fed in the selected compartment.

The card punching device preferably utilized in connection with the present machine is fully shown and described in the patent to F. Lee and G. F. Daly, No. 1,976,618, dated October 9, 1934 and only so much of the operation thereof will be explained as is necessary for an understanding of the operation in connection with the present invention.

In general the punching device contains a feed magazine 301 (Figs. 12 and 13) from which the cards are fed singly from the bottom of a stacker by a picker 302 (Fig. 12) which feeds the card to a position beneath the punches 303 with the first column of the card in position to receive the perforations. Of course, if the check itself comprises a tabulating card then after the amount on the tabulating card check is mentally noted it is manually placed in the punching machine and the carriage positioned for punching by the punches 303 in the first column of the card check.

From this position the card is engaged by a pusher 304 (Fig. 13) mounted on an escapement rack 305 which for each punching operation under control of an escapement mechanism shown in Fig. 10 in the last mentioned patent permits the advance of a card step by step.

A series of magnets 306 is adapted to select the punches for actuation and the energization of the magnets will cause as is well known the shifting of an interposer, such as 307 in Fig. 13, which rocks a bail 308 rocking the same about its pivot 309 to elevate a link 310 to close contacts 311. This as explained in the aforementioned patent and by a circuit to be later described is adapted to close a circitut through a magnet 312 which through its armature 313 and link and bell crank connections 314 is adapted to draw downwardly a pivoted punch bar or plate 315 to force the selected interposer against the selected punch 303, thus perforating the card. The escapement mechanism thereby operates to feed the card carriage a distance of one hole step of the card.

The circuit for the punch magnets 312 (Fig. 7) is from the line side 48 through magnet 312, contacts 311 to the line side 60.

In the present application each punch magnet 306 (Fig. 7) for punching the digits 0-9, inclusive, under control of the keys 260 is energized by the following described circuit, line side 48, a common wire connection 315 to the contacts 316 closed by the depressed keys. From a blade of each of these contacts there are wire connections in a cable 317, and which wires are connected to the punch control magnets 306. The latter have common wire connections 318 to the line side 60. As the keys 260 are successively depressed the punch magnets 306 are selectively energized to select the punches for punching the amount represented on the check on the tabulating card. In successive punching operations the card carriage is fed step by step.

It is pointed out that the machine is capable of taking care of the entering of amounts of nine denominations so preferably the first field at the left end of the tabulating card is provided with nine columns to receive the punched amounts. For digits higher than the digit of the highest denomination zeros are punched. For example, in entering the number —234— the keys numbered 000 000 234 are depressed in order from left to right, the only difference from ten-key adding machine practice being that zeros for orders above the highest denominational digit are entered by successive depression of the "0" key 260.

As the carriage moves step by step a column selector shown in Fig. 13 is moved step by step.

The column selector for punching comprising a movable contact element 319 carried by the carriage and stationary contact elements 320, is well known in the art and is fully shown in Fig. 13 at the left and is more completely described in the patent to G. F. Daly et al., No. 2,016,706 dated October 8, 1935.

After the ninth column of the tabulating card has been punched the carriage escapes to the tenth column position at which time an automatic punching operation is effected and then an automatic punching operation is effected for the eleventh column. The tenth and eleventh columns are punched to represent the number of the compartment selector key 40 previously depressed.

As best shown in Fig. 12 the compartment selector keys 40 are arranged in four rows there being six keys in each row. The designation of the keys depressed is designated on the tabulating card by tens in the tenth column and units in the eleventh column. For example, the first row at the right, or keys 1–6 in Fig. 12, control the punching of the designations 01—02—03—04—05—06. The three lower keys at the next row to the left control punching of 07—08—09. For each of these nine keys there is provided contacts 321 (Fig. 7), one blade of which is connected to a wire 322 which extends a wire in a cable 323 which is connected to a wire in the cable 317 connected to the zero control punch magnet $306_0$. These nine keys also are provided with contacts 324 which when closed select the related punch magnets $306_1$–$306_9$ for the related keys 1–9, the nine wire connections for these magnets also being wires in cables 323 tapped to wires in cable 317 connected to punch magnets $306_1$ to $306_9$.

In a similar manner the three upper keys of the second column from the right, or keys —10—11 and —12—, the six keys of the third column from the right or keys —13—, —14—, —15—, —16—, —17—, —18—, and the bottom key of the column at the extreme left, or key —19— are provided with contacts 325 which select the punch control magnet $306_1$ by the closure of these contacts. These ten keys are each provided with contacts 326 which also select the related punch control magnets $306_0$—$306_9$. These ten keys can, therefore, control the punching of the designations 10—11—12—13—14—15—16—17—18—19.

The remaining keys comprise the five upper keys of the column at the extreme left and control the punching of —20—21—22—23—24—. Contacts 327 in a similar manner cause the selection of the punch control magnet $306_2$, while these keys also cause the selection of punch magnets $306_0$—$306_4$ by contacts 328.

Plug connections 329 are made between sockets 330 of the column contact device for columns ten and eleven and sockets $331_T$ and $331_U$. The first named socket $331_T$ has wire connections 332 to the other blade of the contacts 321, 325 and 327 which select the punch magnets $306_0$, $306_1$, and $306_2$ for punching the tens. Socket $331_U$ has a wire connection 333 to the other blade of the contacts 324, 326 and 328 which select the magnets $306_0$—$306_9$ for punching the units. Hence the selected tens digit 0, 1 or 2 is punched and then the selected units digit 0—9 is punched. As previously stated the punch magnets 306 are connected to the line side 60 so as to effect the closure of the circuit to this side of the line through the selected tens contacts 321, 325, 327 or the selected units contacts 324, 326, 328 to the plug sockets $331_U$ or $331_T$, thence by either plug wire 29 to the column contact 320. The circuit is then continued by the movable contact element 319 to a common conductor strip 319a to contacts 334. The circuit then extends through contacts 334, now closed (and which correspond to contacts 128 in Patent No. 1,976,618,) to contacts 335 now closed (and which correspond to contacts 136 in Patent No. 1,976,618,) to the line side 48.

*Carriage skipping mechanism*

It is believed to be unnecessary to describe this skipping mechanism as it is well known and fully shown and described in the patents to F. L. Lee et al., No. 1,976,618; Schaaff, No. 1,426,223 and N. L. Reed, No. 1,962,750 it only being necessary to understand that after punching the units digit of the number appropriated to the selector key 40 the carriage is automatically skipped to the last column position under control of a skip bar to close contacts 336 (Fig. 7). When the card carriage occupies the last column position a projection carried thereby is adapted to close and maintain contacts 336 closed. These contacts correspond to contacts 191 in Figs. 11 and 15 of Patent No. 1,976,618, and which operation is fully explained therein.

The present machine is also provided with a card ejecting mechanism and a power driven card feeding mechanism so that a new card is fed to the carriage after the punched card has been ejected. These mechanisms are also well known in the art and are shown in the patents to Lee and Daly, No. 1,976,618; F. M. Carroll, No. 1,976,600 and H. L. Reed, No. 1,962,750 and for this reason are only generally explained herein. The card ejecting mechanism is shown in Fig. 14 and is set in operation by closure of contacts 336 which cause by the circuit shown in Fig. 7 the energization of the ejection control relay magnet 337 which closes its relay contacts 337a to thus cause the energization of the ejection control magnet 338. Relay magnet 337 and relay contacts 337a correspond to relay magnet 197 and relay contacts 198 in Patent No. 1,976,618, while the ejection control magnet 338 herein is designated "199" in this patent.

*Card ejecting and card feeding mechanism*

Stated generally, the gripper comprises a pair of jaws 339 and 340 (Fig. 14) urged together by a flat spring 341 but the abutment of a pin 342 with the upper jaw 339 separates the jaws in order that the punched card may be received by the slit-like separation. The card is inserted between the jaws at the termination of the skipping of the carriage to the last column of the card.

The gripper is pivotally mounted on a shaft 342 to which is secured a gear 343 adapted to be driven by a gear 344 through an idler gear. Meshing with gear 344 is a slidably mounted rack 345 the extremity of which terminates in an adjustable cylindrical plunger 346. During the previous restoration of the card carriage by means to be later explained the end of the rack 400 (Fig. 14) of the card carriage in its movement to the left engaged plunger 346 to shift rack 345 to the left against the tension of a spring 347. This caused a clockwise movement of shaft 342 through the train of gears 343—344 to bring the gripper unit to the position shown in Fig. 14, whereupon a latch lever 348 engaged a shoulder 349 of the lower jaw 340. Incidentally, a certain amount of compression was stored up in spring 347. Shifting of latch 348 is effected by energization of the magnet 338 which attracts its armature 380 when the magnet is energized. This causes a shifting movement of a link 381 to the right and by means of a cam shoulder 382 an arm 383 secured to the pivot shaft of latch 348 will be rocked.

This will result in the release of the compression in the spring 347 to cause the counterclockwise rotation of the gripper unit. As the jaw 339 leaves pin 342 spring 341 will act to close the jaw 339 upon the lower jaw 340 thus securely gripping the card and flipping the same in reversed position. A stationary pin 382a may suitably coact with one of the jaws to separate them, permitting the released card to fall upon a second set of flip-over fingers generally designated by numeral 384. As the card is ejected, shifting of rack 345 by spring 347 will cause a square shoulder 384 to engage and close contacts 395. Since contacts 395 are now closed as well as contacts 336, it will be seen from Fig. 7 that a circuit will be completed to a clutch control magnet 396 to energize the latter.

It will now be made clear that after the card has been ejected the motor restoring mechanism will be set into operation to automatically restore the card carriage without attention of the operator.

Magnet 396 corresponds to the magnet designated 175 in Patent No. 1,976,618 and as explained therein and shown in Fig. 13 is adapted to attract its armature when energized and rock a bell crank 624 to open contacts 335 and close contacts 397. The closure of these contacts cause the motor 398 (see Fig. 7) to be connected across the line side 48 and 60. The motor 398 will then run and at the same time a clutch connection is effected between the motor shaft and a drive shaft 399. The rotation of this shaft will thereupon cause the card carriage to be restored and the rack 400 to be moved to the left and cause the picker 302 to feed a new blank card and place the same upon the carriage. The clutch is clearly shown in Fig. 13 and is also in the Patent No. 1,976,618, and particularly disclosed in Fig. 2 thereof and the description of its construction and operation.

Card strippers

It has already been explained how the card is gripped by the gripper unit and flipped around where the inclined position of the flipped-over card permits it to drop freely on the flip-over fingers 384. It is preferable, however, to positively strip the card from the ejector jaws and push the card out of said jaws on top of the flip-over fingers 384.

Attached to a rod 401 is a pair of upwardly extending stripper arms 402. Link 381 is connected at 403 to one of the stripper arms so that when the magnet 338 is deenergized stripper arms 402 will be urged by springs (not shown) to the position shown in Fig. 14, but as soon as the magnet 338 is energized the arms 402 will be moved to the right, the ejector unit in the meantime being swung to the flipped position. Deenergization of magnet 338 which is caused by the restoration of the carriage to open contacts 336 will permit the spring attached to the stripper arms 402 to act to shift the stripper arms 402 to the left to positively remove the card from the jaws and push it on top of the flip-over fingers 384.

Means for flipping ejected punched card to sorter feeding mechanism

The present machine is provided with means to cause the punched card ejected from the punching machine to be flipped over into cooperation with the feeding rollers of the sorting machine and then by an extra push close contacts 178 to cause the automatic operation of the feeding rollers to thus convey the punched card to the selected sorting compartment. This means is best shown in Figs. 12, 14 and 15.

The displacement of the rack 345 (Fig. 14) to the extreme left position will through rack teeth 404 at the lower side rotate a pinion 405 in mesh therewith, said pinion being attached to a shaft 406.

To said shaft 406 as shown in Fig. 12 there is secured a bevel gear 407 meshing with a bevel pinion 408 attached to a rock shaft 409. The two previously mentioned flipper arms 384 are rocked by said shaft 409 so that as the ejector unit is rocked by the means previously described to relatch position to receive the second punched card, the first punched card will be flipped over by the flipper arms 384 and conveyed to the feeding rollers.

The pair of flipper arms 384 is of similar construction so that a description of the construction and operation of one will suffice for all.

As the card is ejected by the ejector unit the left and right vertical edges or its shorter dimension are confined with pairs of brackets 410 and 411, and the lower horizontal edge with brackets 412 all of which are carried by a base plate 413 (Fig. 12). The two flipper arms 384 are normally located over the base plate so that the card is deposited with its upper and lower edges coacting with a bracket 415 and a bracket 414, of each flipper arm 384. These upper and lower edges are along the longer or horizontal dimension of the card and being so held at these edges it will be seen that the card will be turned over by the flipper arms 384.

Each flipper arm comprises several parts now to be described. Rigidly attached to the shaft 409 is an arm 416 carrying a pin 417 so that it will be seen the rocking of shaft 409 counterclockwise will rock arms 416 in the same dierction and to the same extent.

Surrounding the shaft 409 for each flipper 384 is a torsional spring 418 which is anchored at 418a to the arm 416 and the other end bears against the underside of the flat top of an arm which is bail-shaped and loosely mounted on shaft 409. Reference numeral 419 designates the flat top and 420 the two depending side plates. The arm 416 is mounted between the side plates 420 and shaft 409, of course, extends through the side plates 420. By this construction the bail-shaped arm follows the rocking of the arm 416 but a slight movement of the arm 416 independent of the bail-shaped arm is permitted for a reason to be made clear hereinafter.

A slidable plate 421 has affixed thereto a pair of rivets 422 each of which project through slots 423 of the flat top 419 of the bail-shaped arm and each of said rivets is also attached to a plate 424 mounted on the top of the flat top 419 and integral with the bracket 415. By such an arrangement the plates 421 and 424 are slidably mounted and can slide on the flat top 419. The bottom plate 421 has a downward side plate extension 425 which is provided with a slot 426 receiving the pin 417 carried by the arm 416.

The side plates 420 have bent portions 427 and between the side plates 420 there is secured a rubber bumper 428.

The bracket 414 is carried by an arm 429 pivoted by a pivot 430 to one of the side plates 420 and said arm 429 carries a pin 431 received by a cam slot 432 formed in the extension 425.

With the punched card between the brackets 414 and 415 rocking of the shaft 409 will rock both flipper arms 384 to the dash dot line position in Fig. 15 carrying the card over, the bracket 414 closely contacting curved guide cover plates

432. When the arms 384 are rocked to the dotted line position as shown in Fig. 15 the rubber block 426 will strike a fixed block 433 thus stopping the movement of the bail-shaped arms. However, shaft 409 rocks further and by means of the pin 417 the bail plates 421 and 424 are shifted, the bracket 415 now shifting the punched card downwardly as shown by dash dot lines in Fig. 15 to shift the merger blade of the contacts 178, thereby closing said contacts 178 and causing the engagement of the clutch shown in Fig. 8 to cause rollers 350 to rotate to feed the card to the selected pocket.

To accomplish this shift of the card, the bracket 414 must be moved out of cooperation with the card and this is effected by the cam slot 432 in cooperation with the pin 431 of the arm 429 which carries the bracket 414.

The shaft 409 will when the card grippers are released be reversely rocked to restore the flipper arms 384 to their normal position ready to receive a second punched card deposited thereon.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. The combination with means for punching records to represent amounts of different classifications, of a sorting mechanism comprising sorting compartments, means comprising keys for selecting said sorting compartments, means for feeding the punched records into preselected sorting compartments, and means initiated in operation by the punched record for causing the operation of the feeding means for feeding the punched record to the preselected sorting compartment.

2. The combination with means for punching records to represent amounts of different classifications of a sorting mechanism comprising a plurality of selectable compartments and selecting means to select said compartments, means for feeding the punched records into the selected compartments, and means initiated in operation by the punched record for causing the operation of the feeding means for feeding the punched record to the preselected sorting compartment.

3. In a system of the class described, the combination with a key controlled record sorting machine comprising record receiving compartments and means under control of keys for selecting said compartments, of a punching machine comprising means for punching amounts on said records, means for feeding said punched records to the selected compartment, and means initiated in operation by a punched record for causing the operation of said feeding means.

4. In a system of the class described the combination with a key controlled sorting machine comprising record receiving compartments and means under control of said keys for selecting said compartments, of a punching machine including means controlled by said keys for punching a designation on records to designate the compartment selected, and supplemental keys for controlling said punching means for causing the punching of amounts on said records, means for feeding said punched records to the selected compartment, and means initiated in operation by a punched record for causing the operation of said feeding means.

5. In a system of the class described the combination with a key controlled sorting machine comprising record receiving compartments and means under control of said keys for selecting said compartments, a punching machine comprising manually controlled means for punching amounts digit by digit on a record to be sorted and including means for automatically causing said punching means under control of said keys to punch a number representing the compartment selected on said record, and means initiated by the operation of said punched record for causing the operation of means to feed the punched record to the selected compartment.

6. In a combined sorting and punching machine provided with sorting compartments selected by keys according to the classification of records to be sorted, the combination with a punching machine including digit punching means, of manually controlled means operable after a compartment has been selected for causing the operation of said punching means to punch digit by digit a representation of an amount on the record to be sorted, and means initiated in operation by the punched record for causing the operation of means to feed the punched record into the selected sorting compartment.

7. In a combined sorting and punching machine, a carrier carrying a plurality of punched record receiving compartments and key controlled means for causing the movement of said carrier to bring a selected compartment to a record receiving position, means for punching under control of supplemental keys an amount on the record to be sorted, and means initiated in operation by said punched record for feeding the punched record to the selected compartment.

8. The combination with a plurality of selectable sorting compartments, of means for punching a record to represent an amount, means for punching said record to represent a selected sorting compartment, means for feeding the punched record to the selected sorting compartment, and means initiated in operation by the punched record to cause the last named means to effect a record feeding operation.

9. The combination with a plurality of selectable punched record receiving sorting compartments, of means for punching a record to represent an amount, means for punching said record to represent a selected sorting compartment, and key controlled means for selecting a compartment and for controlling the last named punching means.

10. The combination with a key controlled sorting machine comprising means under control of keys for selecting compartments for receiving punched records, of a separable punching machine comprising means under control of keys for punching a record to represent an amount, and means in said punching machine for initiating the operation of said punching means to punch under control of the first named keys a representation of the compartment selecting key operated, means for ejecting the punched record out of said punching machine, and means for feeding the ejected record into the compartment selected by the compartment key operated.

11. The combination with a plurality of selectable punched record receiving compartments, of means for punching a record to represent by designations thereon a selected sorting compartment, means for selecting a sorting compartment, and key controlled means for controlling the operation of the last named punching means and the operation of said selecting means to select a compartment for a receiving record.

12. In a machine of the class described, in combination, a plurality of sorting camportments, a plurality of keys for selecting said compartments, and means controlled by said keys for punching records to be sorted with designations representing the keys operated and the compartments selected by said keys.

13. In a machine of the class described, in combination, a plurality of sorting compartments, a plurality of keys for selecting said compartments, record punching means, means controlled by supplemental keys for causing records to be sorted in said compartments to be punched to represent amounts, means controlled by said compartment selecting keys for setting up punch controlling means for said punching means, and means automatically operable when an amount has been punched on a record for causing said punch controlling means to punch the record to represent the compartment selecting key operated.

14. In a machine of the class described, in combination, means for punching a record, manually controlled means for controlling said punching means, a plurality of selectable sorting compartments, and means for feeding a record to a selected compartment, and means initiated in operation by a punched record for causing said feeding means to feed a punched record to selected compartment.

15. In combination, a punching machine comprising punching means and manually controlled means for controlling said punching means to punch records representing amounts of different classifications, a plurality of sorting compartments for sorting said punched records, and manually controlled means for selecting said sorting compartments according to the classifications of the punched records.

SAMUEL BRAND.